Dec. 19, 1933.  H. D. LESTER  1,940,357
AUTOMATIC FREE WHEELING MECHANISM
Filed Jan. 17, 1933   2 Sheets-Sheet 1
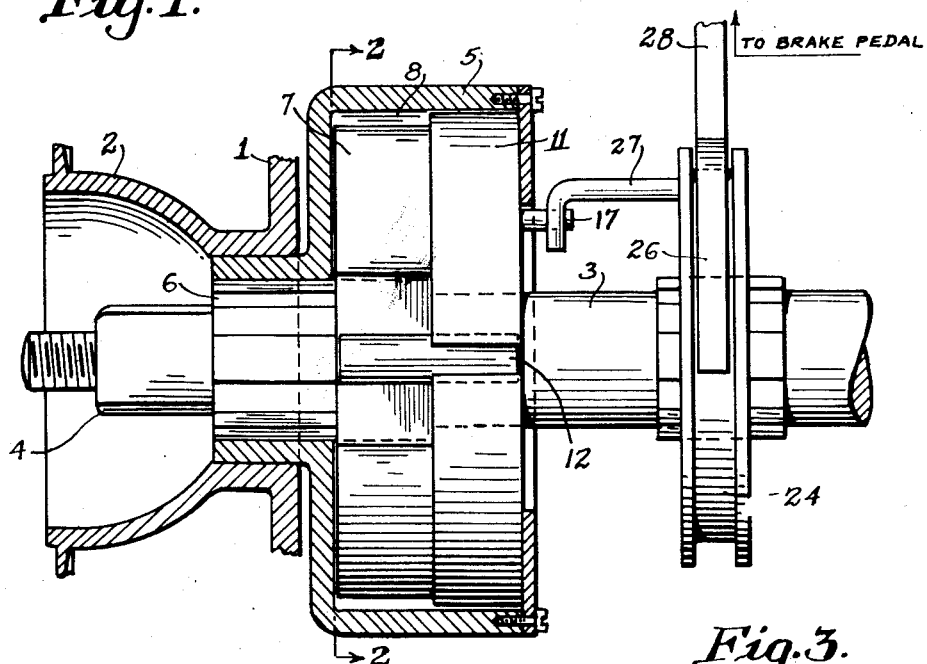
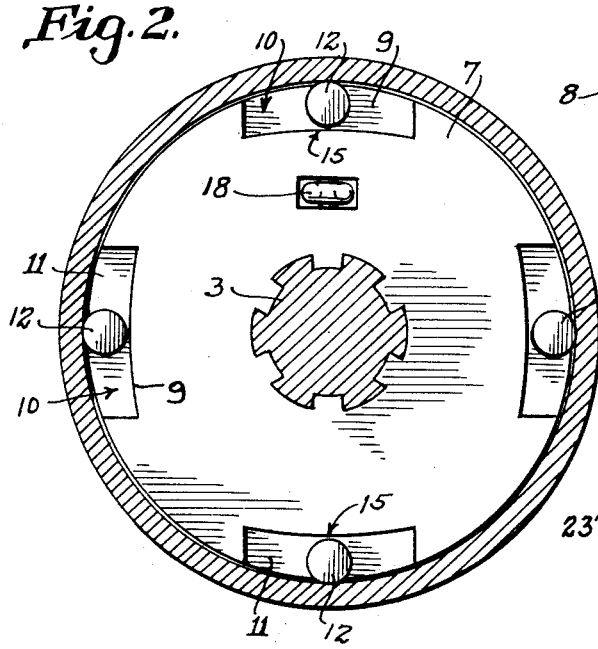
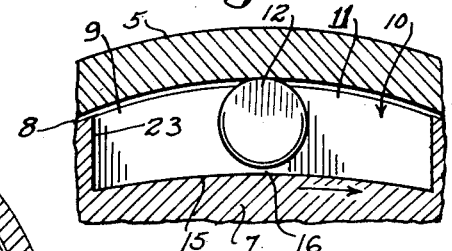
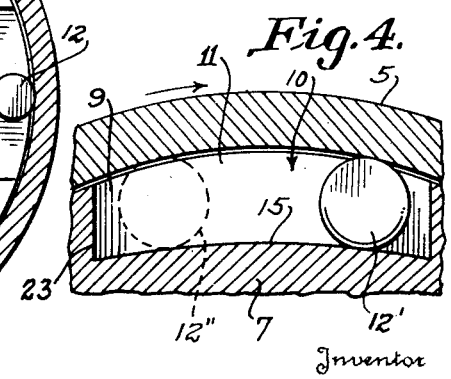
Inventor
HOPE D. LESTER Dec. 19, 1933.   H. D. LESTER   1,940,357
AUTOMATIC FREE WHEELING MECHANISM
Filed Jan. 17, 1933   2 Sheets-Sheet 2
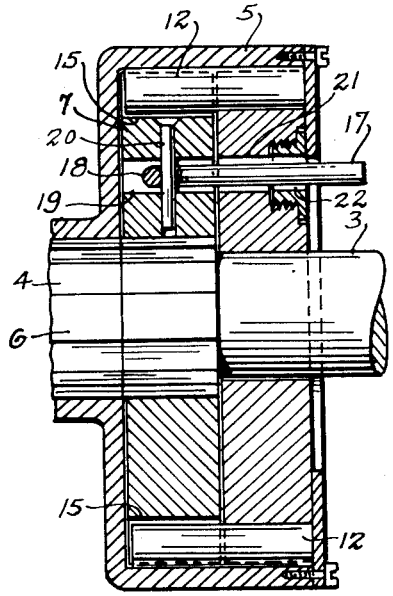
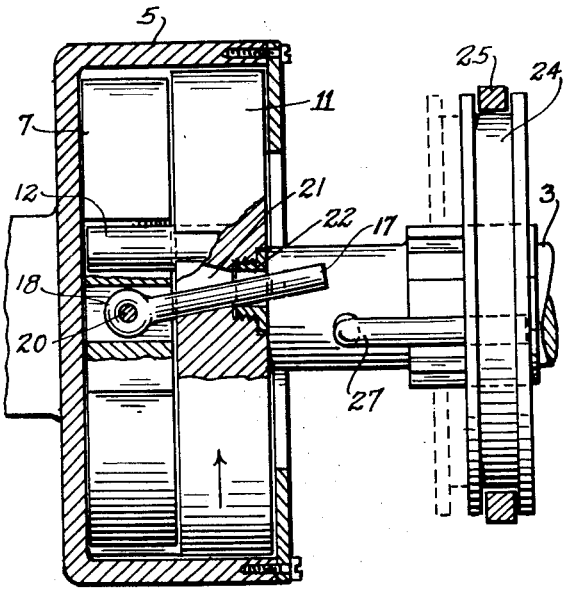
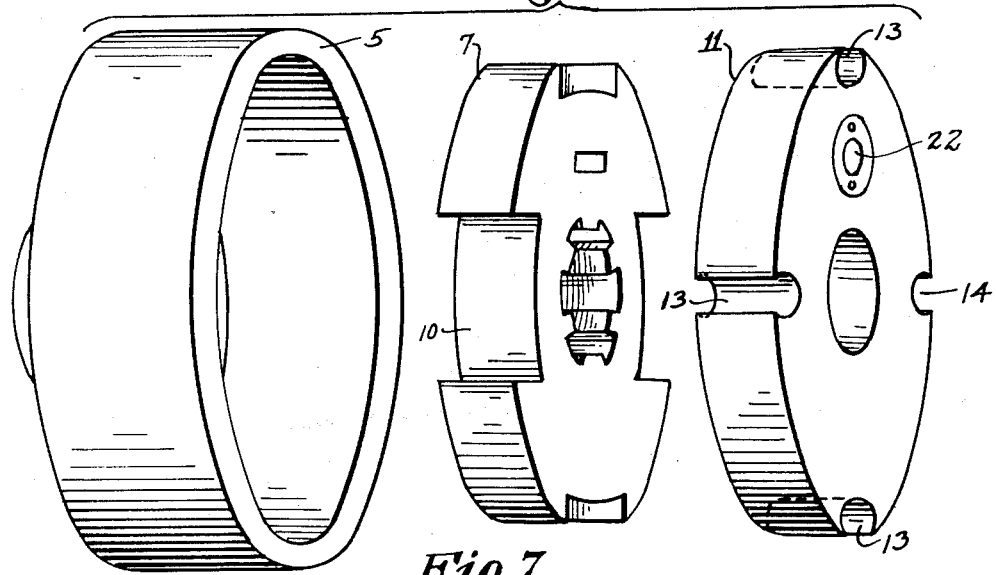
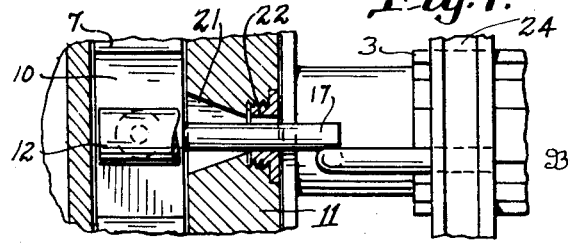
Inventor
HOPE D. LESTER
By Mason Fenwick Lawrence
Attorney Patented Dec. 19, 1933

1,940,357

UNITED STATES PATENT OFFICE 1,940,357

AUTOMATIC FREE WHEELING MECHANISM

Hope D. Lester, Miami, Fla.

Application January 17, 1933. Serial No. 652,223

8 Claims. (Cl. 192—48)

This invention relates to free wheeling mechanism for auto vehicles, and it has for its general object the provision of apparatus operating upon the principle of the over-running clutch, the elements of which automatically shift from the position of engine drive to that of engine brake, or vice versa, according to the relative speeds of the engine and propeller shafts, and which upon the positioning of a setting member is limited in its automatic shifting range from the position of positive engine drive to an intermediate position in which the clutch elements are dis-engaged, this being the free wheeling relation.

Another object of the invention is the association of the setting member with the brake so that upon applying the brake, the setting member is withdrawn from its inhibiting position with respect to the shifting element of the clutch, the latter being then free to move immediately into the position in which the engine is coupled as a brake to the drive shaft.

A further object of the invention is the provision of a free wheeling device characterized by the absence of inter-meshing connections, and necessitating no synchronization of moving parts in changing to or from free wheeling position.

Other objects of the invention will appear as the following description of an exemplary embodiment thereof proceeds.

In the drawings which accompany and form a part of the following specification and throughout the several figures of which the same characters of reference have been employed to denote identical parts:

Figure 1 is a longitudinal section through the free wheeling device;

Figure 2 is a section taken along the line 2—2 of Figure 1;

Figure 3 is a longitudinal section of one of the pockets showing the bearing element in intermediate or free wheeling position;

Figure 4 is a similar view showing the bearing element in one of its extreme positions in full lines and in the other, in broken lines;

Figure 5 is a diametrical section through the over-running clutch elements;

Figure 6 is a similar view, the parts being shown in coupled relation;

Figure 7 is a fragmentary view showing the parts in free wheeling position; and

Figure 8 is an exploded view showing the principal elements of the clutch in dis-assembled relation.

Referring now in detail to the several figures, the numeral 1 represents a fragment of a casing which is to be secured to or from a part of the transmission housing of the engine and auto vehicle, 2 being a hemispherical extension forming part of the housing of the universal joint. Driving and driven shafts are indicated respectively at 3 and 4, the driven shaft having a drum 5 secured thereto as by splines 6 and a disk or plate 7 being secured to the inner end of the drive shaft and housed within the drum. The diameter of the plate 7 is such that a slight clearance 8 exists between the periphery of the plate 7 and the inner circumferential surface of the drum.

Figure 2 shows that the plate 7 is provided at spaced intervals, preferably symmetrically arranged, with recesses 9, the bottom walls of which are preferably formed as arcs of less curvature than that of the circumscribing wall of the drum 5 so that pockets 10 are defined between the plate 7 and the inner wall of the drum which are slightly wider in the middle than at the ends.

Freely revoluble upon the drive shaft 3 is a second plate 11 which in the present exemplary embodiment of the invention is shown as being of substantially the same diameter as the plate 7, and also housed within the drum 5. The plate 11 preferably lies against or closely adjacent to the plate 7 as shown, and is in fact, a cage or carriage for any friction elements in the form of rollers 12 which are loosely housed in the cylindrical bores 13 opening circumferentially in the plate 11 as shown at 14, in Figure 8, and being displaced by angles corresponding to the angles of displacement of the recesses 9. The axes of the rollers 12 are so located that when the plate 11 is in position within the drum 5, the rollers are snugly tangent to the inner wall of the drum 5, serving as bearings therefor. Figures 2 and 3 show that the rollers are slightly smaller in diameter than the intermediate depth of the pockets 10 so that when the rollers are in intermediate position, they are slightly spaced from the base walls 15 of the recesses 9.

The plates 7 and 11 are connected together so that when the drive shaft 3 rotates, the plate 7 also rotates and carries with it the plate 11. It will thus be understood that when the rollers 12 are in the intermediate positions shown in Figures 2 and 3, they revolve around the inner periphery of the drum 5, but have no effect in rotating said drum since they are free in view of the clearance 16, Figure 3, between the rollers and the base walls of the recesses 9.

The connecting means between the plates 7 and 11 is clearly shown in Figures 5 and 6, and comprises a bar 17 preferably formed with an eye 18 at its inner end and pivotally mounted in a slot 19 in the plate 7 by means of a pin 20 radially disposed and passing through the eye 18. The bar 17 passes through a flared slot 21 in the plate 11 and projects on the outside of said plate. The point of emergence of the bar 17 from the outer face of the plate 11 is a hole of such size as to afford the minimum amount of lost motion to accommodate the canting of the bar 17. Since said bar bears against the plate 11 only in the region of its point of emergence, wear piece 22 of hard material is preferably inserted at this point.

It may now be explained that the bar 17 affords a means for allowing limited displacement of the plate 11 relative to the plate 7, and for thwarting said displacement at any desired point. When the bar 17 is in the intermediate position shown in Figure 7, the plate 11 is so positioned that the rollers 12 are in mid-positions in the pockets 10, in other words, the rollers are in released position of the clutch. When the bar 17 shall have moved to the inclined position shown in Figure 6, or in an equally inclined position in the opposite direction, the plate 11 will have become displaced so as to throw the rollers 12 either in the full line position shown at 12' in Figure 4, or the dotted line position 12''. In either of these positions, the rollers 12 will have moved into a region of the pockets 10 in which the diameter of the rollers exceeds the depths of the pockets so that the rollers wedge themselves into said pockets creating a thrust against the inner wall of the drum 5 which firmly locks said drum and the plate 7 together.

The nature of the displacement of the plate 11 relative to the plate 7 is normally automatic. Supposing for example, referring to Figures 3 and 4, that the drum 5 is stationary and that the drive shaft travelling with the plate 7 is travelling in the direction of the arrow in Figure 3. The roller bearings carried by the plate 11 will be in contact with the stationary drum and therefore for the moment will hold the plate 11 stationary so that in the rotation of the plate 7, the shoulder 23 will advance toward the stationary bearing roller 12, the latter thus approaching the left end of the pocket 10 until it wedges or jams. In this manner the drum 5 becomes positively coupled to the engine driven plate 7 and the drum rotates with the plate. Supposing now that the speed of the engine be slowed down or the speed of the vehicle be relatively increased, due for example, to its travelling down grade, the drum 5 will travel in the direction of the arrow shown in Figure 4, relative to the plate 7 so that the roller will shift from the broken line position to the full line position shown at the right where it will again jam, coupling the engine and driven shaft together, the engine in this instance acting as a brake.

It will be understood that this shifting is altogether automatic, depending solely upon the differential speed between the engine and vehicle and requiring no thought or attention on the part of the driver. The free wheeling function is performed by holding the roller 12 in the intermediate position shown in Figure 3. This is accomplished by means of a setting device comprising a flanged collar 24 or equivalent means slidably mounted upon the drive shaft, and a yoke 25 having the usual bifurcated ends 26 operating against said collar between said flanges. A setting element 27 extends toward the plate 11, but normally out of the path of revolution of the bar 17. The setting member is so arranged that when it is extended into the path of the bar 17, it will stop said bar and with it the plate 11 through which the bar projects at such point as to position the roller 12 in the intermediate part of the pocket 10 as shown in Figures 3 and 7. It is not essential to synchronize the operation of the setting means with the rotation of the plate 11, merely to project it into the path of the bar 17 which upon revolving engages said setting member.

The effect of the setting member 27 is merely to limit the range of swing of the bar 17 and the displacement of the plate 11. With the setting member in free wheeling position, there is nothing to prevent the engine, exemplified by the plate 7, over-running the drum 5 and bringing the roller 12 into interlocking position between the drum 5 and the plate 7. On the other hand, when the drum 5 over-runs the speed of the drive shaft, the roller 12 is released from its binding relation between the driving and driven elements and assumes an intermediate position, but it cannot shift to the position in which the engine is locked to the driven element as a brake, on account of the interference interposed by the setting member 27.

Figure 1 indicates that it is preferred to connect the pedal actuating rod 28 to the brake pedal so that when it is desired to apply the brake, the setting member 27 is automatically withdrawn and the rollers 12 permitted to slip immediately into interlocking position between the driving element 7 and the driven element 5.

While I have described the plates 7, 11 and the shaft 3 with which they are associated as the driving element and the drum as the driven element of the clutch, it is obvious to those skilled in the art that the relation of the parts may be reversed.

It is also to be understood that while I have illustrated and described specific means for connecting the plates 7 and 11 together with limited freedom of angular displacement for the purpose set forth, the details of construction are to be considered by way of example and not as limiting the scope of the invention as claimed.

What I claim is:

1. Free wheeling mechanism for auto vehicles comprising driving and driven elements, one being a drum and the other including adjacent plates mounted within said drum co-axially with respect thereto, the dimensions of said plates providing peripheral clearance with respect to said drum, one of said plates being formed with peripheral depressions symmetrically displaced, having base faces forming with the circumscribing periphery of said drum, pockets, of less depth at an end than in the middle, the other plate carrying bearing elements projecting laterally into said pockets and tangent to the peripheral wall of said drum, being so dimensioned as to wedge between the base walls of said depressions and the peripheral wall of said drum near the said ends of said pockets, means connecting said plates with allowance for angular displacement equivalent at least to the range of movement of said bearing elements in said pockets, and means operable at will for stopping said connecting means at a point corresponding to a free position of said bearing elements in said pockets.

2. Free wheeling mechanism for auto vehicles comprising driving and driven elements, one being a drum and the other including adjacent plates mounted within said drum co-axially with respect thereto, the dimensions of said plates providing peripheral clearance with respect to said drum, one of said plates being formed with peripheral depressions, having base faces forming with the circumscribing periphery of said drum, pockets, of less depth at the ends than in the middle, the other plate carrying bearing elements projecting laterally into said pockets and tangent to the peripheral wall of said drum, said bearing elements being so dimensioned as to wedge between the base walls of said depressions and the peripheral wall of said drum near the ends of said pockets, normally uncontrolled means connecting said plates with allowance for angular displacement equivalent at least to the range of movement of said bearing elements in said pockets, said means projecting beyond the outer face of the bearing element carrying plate, and means projectable at will into the path of movement of said connecting means for stopping it at a point corresponding to an intermediate position of said bearing elements with respect to said pockets.

3. Free wheeling mechanism for auto vehicles comprising driving and driven elements, one being a drum and the other including adjacent plates, at least one of which plates being mounted within said drum co-axially with respect thereto, the dimensions of said plates providing peripheral clearance with respect to said drum, one of said plates being formed with peripheral depressions symmetrically displaced, having base faces forming with the circumscribing periphery of said drum, pockets, of less depth at the ends than in the middle, the other plate carrying bearing elements projecting laterally into said pockets and tangent to the peripheral wall of said drum, being so dimensioned as to wedge between the base walls of said depressions and the peripheral wall of said drum near the ends of said pockets, means connecting said plates with allowance for angular displacement equivalent at least to the range of movement of said bearing elements in said pockets, and means operable at will for stopping said connecting means at a point corresponding to an intermediate position of said bearing elements with respect to said pockets.

4. Free wheeling mechanism for auto vehicles comprising driving and driven elements, one being a drum and the other including adjacent plates, one of said plates being formed with peripheral depressions symmetrically displaced, said plate being mounted in said drum co-axially with respect thereto and having a dimension which provides peripheral clearance with respect to said drum, the base faces of said depressions forming with the circumscribing periphery of said drum, pockets, of less depth at the ends than in the middle, the other of said adjacent plates carrying bearing elements projecting laterally into said pockets and tangent to the peripheral wall of the drum, and being so dimensioned as to wedge between the base walls of said depressions and the peripheral wall of said drum near the ends of said pockets, means connecting said plates with allowance for angular displacement equivalent at least to the range of movement of said bearing elements in said pockets, and means operable at will for stopping said connecting means at a point corresponding to an intermediate position of said bearing elements with respect to said pockets.

5. Free wheeling mechanism for auto vehicles comprising driving and driven elements, one being a drum and the other including adjacent plates, one of said plates being formed with peripheral depressions symmetrically displaced, said plate being mounted in said drum co-axially with respect thereto and having a dimension which provides peripheral clearance with respect to said drum, the base faces of said depressions forming with the circumscribing periphery of said drum, pockets, of less depth at the ends than in the middle, the other of said adjacent plates carrying bearing elements projecting laterally into said pockets and tangent to the peripheral wall of the drum, and being so dimensioned as to wedge between the base walls of said depressions and the peripheral wall of said drum near the ends of said pockets, connecting means including a bar swingably mounted on a radial axis in the first mentioned of said adjacent plates and passing with a free fit through a suitably formed aperture in the other of said adjacent plates for permitting angular displacement of said second mentioned plate equivalent at least to the range of movement of said bearing elements in said pockets, and means projectable at will into the path of said swinging bar for stopping it together with the second mentioned plate at a point corresponding to an intermediate position of said bearing elements with respect to said pockets.

6. Free wheeling mechanism for auto vehicles comprising driving and driven elements, one being a drum and the other including adjacent plates, a shaft, one of said plates being secured to said shaft and being formed with peripheral depressions symmetrically displaced, said plate being mounted in said drum co-axially with respect thereto and having a dimension which provides peripheral clearance with respect to said drum, the base faces of said depressions forming with the circumscribing periphery of said drum, pockets, of less depth at the ends than in the middle, the other of said adjacent plates being mounted revolubly with respect to said shaft, carrying bearing elements projecting laterally into said pockets and tangent to the peripheral wall of the drum, and being so dimensioned as to wedge between the base walls of said depressions and the peripheral wall of said drum near the ends of said pockets, means connecting said plates with allowance for angular displacement equivalent at least to the range of movement of said bearing elements in said pockets, and means operable at will for stopping said connecting means at a point corresponding to an intermediate position of said bearing elements with respect to said pockets.

7. Free wheeling mechanism for auto vehicles comprising driving and driven elements, one being a drum and the other including adjacent plates mounted within said drum co-axially with respect thereto, the dimensions of said plates providing peripheral clearance with respect to said drum, one of said plates being formed with peripheral depressions symmetrically displaced, having base faces forming with the circumscribing periphery of said drum, pockets, of less depth in one portion than at another, the other plate carrying bearing elements projecting laterally into said pockets and tangent to the peripheral wall of said drum, being so dimensioned as to wedge between the base walls of said depressions and the peripheral wall of said drum in the narrower portions of said pockets, means connecting said plates with allowance for angular displacement equivalent at least to the range of movement of said elements in said pockets, and means operable at will for stopping said connecting means at a point corresponding to a free position of said bearing elements in said pockets.

8. Free wheeling mechanism for auto vehicles comprising driving and driven elements, one being a drum and the other including adjacent plates mounted within said drum coaxially with respect thereto, the dimensions of said plates providing peripheral clearance with respect to said drum, one of said plates being formed with peripheral depressions symmetrically displaced, having base faces forming with the circumscribing periphery of said drum, pockets, of less depth at the ends than in the middle, the other plate carrying bearing elements projecting laterally into said pockets and tangent to the peripheral wall of said drum, being so dimensioned as to wedge between the base walls of said depressions and the peripheral wall of said drum near the ends of said pockets, means connecting said plate with angular allowance for automatic lateral displacement of said plate in either direction according to whether the driven element overruns the driving element or vice versa, and means operable at will for stopping said connecting means at a point corresponding to a free position of said bearing elements in said pockets.

HOPE D. LESTER.